(12) United States Patent
Holgerson et al.

(10) Patent No.: US 11,723,319 B2
(45) Date of Patent: Aug. 15, 2023

(54) ENERGY SAVING GREENHOUSE SCREEN

(71) Applicant: AB LUDVIG SVENSSON, Kinna (SE)

(72) Inventors: Per Holgerson, Brämhult (SE); Daniel Asplund, Landvetter (SE)

(73) Assignee: AB LUDVIG SVENSSON, Kinna (SE)

( * ) Notice: Subject to any disclaimer, the term of this patent is extended or adjusted under 35 U.S.C. 154(b) by 1006 days.

(21) Appl. No.: 16/305,201

(22) PCT Filed: May 30, 2017

(86) PCT No.: PCT/EP2017/063035
§ 371 (c)(1),
(2) Date: Nov. 28, 2018

(87) PCT Pub. No.: WO2017/207568
PCT Pub. Date: Dec. 7, 2017

(65) Prior Publication Data
US 2020/0315102 A1 Oct. 8, 2020

(30) Foreign Application Priority Data

May 30, 2016 (SE) .................................. 1650748-5

(51) Int. Cl.
*D03D 15/46* (2021.01)
*D04B 21/16* (2006.01)
(Continued)

(52) U.S. Cl.
CPC ............. *A01G 9/22* (2013.01); *A01G 9/1438* (2013.01); *A47H 23/14* (2013.01); *B32B 5/024* (2013.01);
(Continued)

(58) Field of Classification Search
CPC .......... A01G 9/1438; A01G 2009/1446; B32B 27/08; B32B 27/36; B32B 2255/10;
(Continued)

(56) References Cited

U.S. PATENT DOCUMENTS

| 3,941,752 A | 3/1976 | Kleiner et al. |
| 4,571,363 A * | 2/1986 | Culbertson .............. G03C 1/93 428/332 |

(Continued)

FOREIGN PATENT DOCUMENTS

| CN | 1226573 | 11/2005 |
| CN | 1955762 | 6/2010 |

(Continued)

OTHER PUBLICATIONS

K-Patents, "Refractive Index Measurement Principle". (Year: 2021).*
(Continued)

*Primary Examiner* — Jeremy R Pierce
*Assistant Examiner* — Christine X Nisula
(74) *Attorney, Agent, or Firm* — Ballard Spahr LLP

(57) ABSTRACT

A greenhouse screen strips of film material that are interconnected by a yarn system of transverse threads and longitudinal threads by means of knitting, warp-knitting or weaving process to form a continuous product, wherein at least some of the strips comprise a film material in the form of a single- or multilayer polyester film is disclosed. The film material has a transparency of at least 93.5% and is provided with at least a first anti-reflective coating or layer on a first side of the film material.

17 Claims, 2 Drawing Sheets

(51) Int. Cl.
*A01G 9/22* (2006.01)
*A47H 23/14* (2006.01)
*B32B 5/02* (2006.01)
*B32B 5/26* (2006.01)
*B32B 7/12* (2006.01)
*B32B 27/08* (2006.01)
*B32B 27/12* (2006.01)
*B32B 27/18* (2006.01)
*B32B 27/36* (2006.01)
*A01G 9/14* (2006.01)
*C08K 5/00* (2006.01)
*D06M 15/263* (2006.01)
*D03D 15/60* (2021.01)
*D03D 15/547* (2021.01)
*C08G 63/181* (2006.01)

(52) U.S. Cl.
CPC ................. *B32B 5/26* (2013.01); *B32B 7/12* (2013.01); *B32B 27/08* (2013.01); *B32B 27/12* (2013.01); *B32B 27/18* (2013.01); *B32B 27/36* (2013.01); *C08K 5/005* (2013.01); *D03D 15/46* (2021.01); *D06M 15/263* (2013.01); *A01G 2009/1446* (2013.01); *B32B 2255/10* (2013.01); *B32B 2255/26* (2013.01); *B32B 2255/28* (2013.01); *B32B 2307/412* (2013.01); *B32B 2307/418* (2013.01); *B32B 2410/00* (2013.01); *C08G 63/181* (2013.01); *D03D 15/547* (2021.01); *D03D 15/60* (2021.01); *D04B 21/165* (2013.01); *D06M 2200/25* (2013.01); *D10B 2401/22* (2013.01); *D10B 2505/18* (2013.01); *Y10T 442/107* (2015.04); *Y10T 442/322* (2015.04); *Y10T 442/3228* (2015.04); *Y10T 442/431* (2015.04); *Y10T 442/463* (2015.04)

(58) Field of Classification Search
CPC ............ B32B 2255/26; B32B 2255/28; B32B 2307/412; B32B 2307/416; B32B 2307/418; B32B 2410/00; B32B 2250/03; B32B 2250/244; B32B 2307/732; D06M 2200/25; D10B 2401/22; D10B 2505/18; D03D 15/547; Y02A 40/25; C09D 5/006; C08J 2367/02; C08J 2433/04; C08J 5/18
See application file for complete search history.

(56) References Cited

U.S. PATENT DOCUMENTS

| | | | |
|---|---|---|---|
| 4,626,465 | A | 12/1986 | Henningsson |
| 6,797,358 | B2 | 9/2004 | Murschall et al. |
| 7,851,054 | B2 | 12/2010 | Weber et al. |
| 9,003,698 | B2 | 4/2015 | Andersson et al. |
| 9,167,754 | B2 | 10/2015 | Andersson et al. |
| 2001/0018476 | A1* | 8/2001 | Murschall ............... C08J 3/226 524/86 |
| 2003/0203227 | A1 | 10/2003 | Murschall et al. |
| 2006/0008638 | A1 | 1/2006 | Kiehne et al. |
| 2006/0134382 | A1 | 6/2006 | Jesburger et al. |
| 2013/0008082 | A1 | 1/2013 | Andersson et al. |
| 2014/0308529 | A1* | 10/2014 | Hardinghaus ........ C09D 5/1618 428/447 |
| 2015/0059239 | A1 | 3/2015 | Andersson et al. |
| 2017/0208752 | A1* | 7/2017 | Lohre ..................... B32B 7/02 |

FOREIGN PATENT DOCUMENTS

| | | | |
|---|---|---|---|
| CN | 201519033 | | 7/2010 |
| CN | 104513403 | A | 4/2015 |
| CN | 104837624 | | 8/2015 |
| CN | 104918485 | | 9/2015 |
| CN | 105058934 | A | 11/2015 |
| CN | 103841820 | | 12/2016 |
| CN | 104737039 | | 6/2017 |
| CO | 06007666 | | 1/2006 |
| DE | 2346787 | A1 | 3/1975 |
| DE | 69731750 | T2 | 2/2006 |
| EP | 0004216 | A1 | 9/1979 |
| EP | 0109951 | A1 | 5/1984 |
| EP | 0144948 | A | 6/1985 |
| EP | 0144948 | A2 * | 6/1985 ............. C08J 7/042 |
| EP | 0769540 | A | 4/1997 |
| EP | 1342824 | A1 | 9/2003 |
| EP | 2340706 | A1 | 7/2011 |
| FR | 2071064 | A5 | 9/1971 |
| FR | 3038811 | A1 | 1/2017 |
| JP | S5588632 | | 7/1980 |
| JP | S63-153134 | A | 6/1988 |
| JP | 2005-249982 | A | 9/2005 |
| JP | 2006176774 | | 7/2006 |
| JP | 2007-025078 | A | 2/2007 |
| JP | 2009211078 | | 9/2009 |
| JP | 2011217681 | | 11/2011 |
| JP | 2012019712 | | 2/2012 |
| JP | 2013190635 | | 9/2013 |
| JP | 2014531900 | | 12/2014 |
| KR | 10-2016-0023476 | A | 3/2016 |
| WO | WO-98/06575 | | 2/1998 |
| WO | WO-2008/091192 | | 7/2008 |
| WO | WO 2011/096882 | | 8/2011 |
| WO | WO 2008120406 | A1 | 10/2018 |

OTHER PUBLICATIONS

Espacenet translation of CN-105058934-A. (Year: 2015).*
Espacenet translation of CN1226573A. (Year: 1999).*
CAS Registry No. 63562-34-5; Aug. 15, 2017 (5 pages).
Woollam, J.A. et al., Overview of Variable Angle Spectroscopic Ellipsometry (VASE): I. Basic Theory and Typical Applications. Proc SPIE. 1999; CR72:3-28.
International Search Report and Written Opinion dated Aug. 28, 2017 by the International Searching Authority for Patent Application No. PCT/EP2017/063035, which was filed on May 30, 2017 and published as WO 2017/207568 on Dec. 7, 2017 (Inventor-Holgerson et al.; Applicant_13 AB Ludvig Svensson) (9 pages).
Notice of Opposition dated Jan. 21, 2021, in EP Patent No. 3 462 839.
Baesa, E. et al. "Light Transmission through Greenhouse Covers", Proc. 7th IS on Light in Horticultural Systems, Acta Hort. 956, ISHS 2012, pp. 425-440.
More light with H2no dated June 8.2016, https://www.ludvigsvensson.com/en/climate-screens/news/posts/2016/june/more-light-with-h2no/ (Nov. 9, 2020).
Product description H2no technology on greenhouse screen LUXOUS 1347 FR, Ludvig Svensson, Jun. 8, 2016.
Study Wageningen Universtit (WUR) Gert Jan Swinkels, Apr. 21, 2015 "Winterlichtkas met maximale lichttransmissie".
Trade Paper "Onder glas", Anti-Reflectie doek/schermen; Scherm vormt dunne transparante laag met anti-reflectie eigenschappen, Tomatentelers besparen energie met extra lichtdoorlatende schermdoek, No. 4, Apr. 2011, pp. 50-51.

* cited by examiner

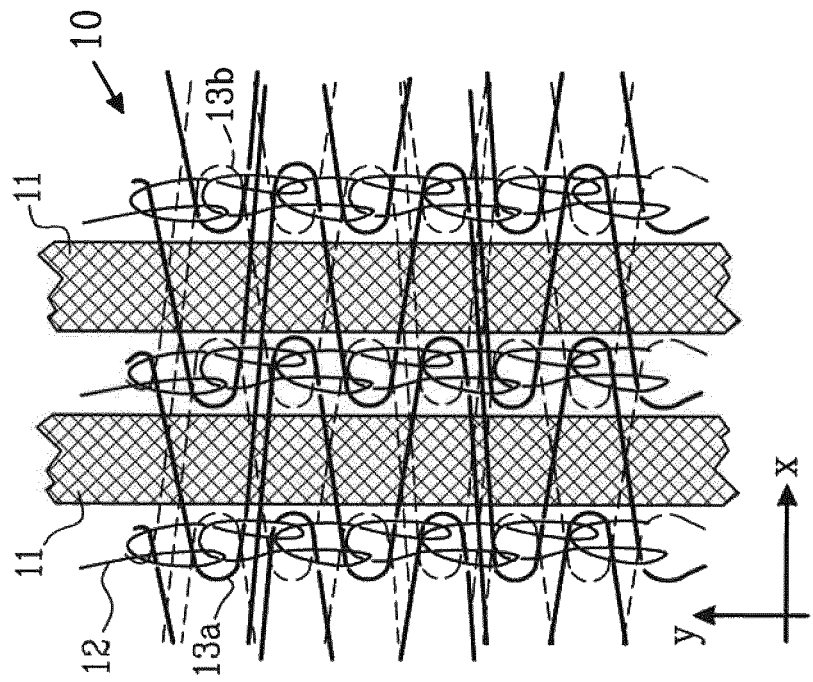
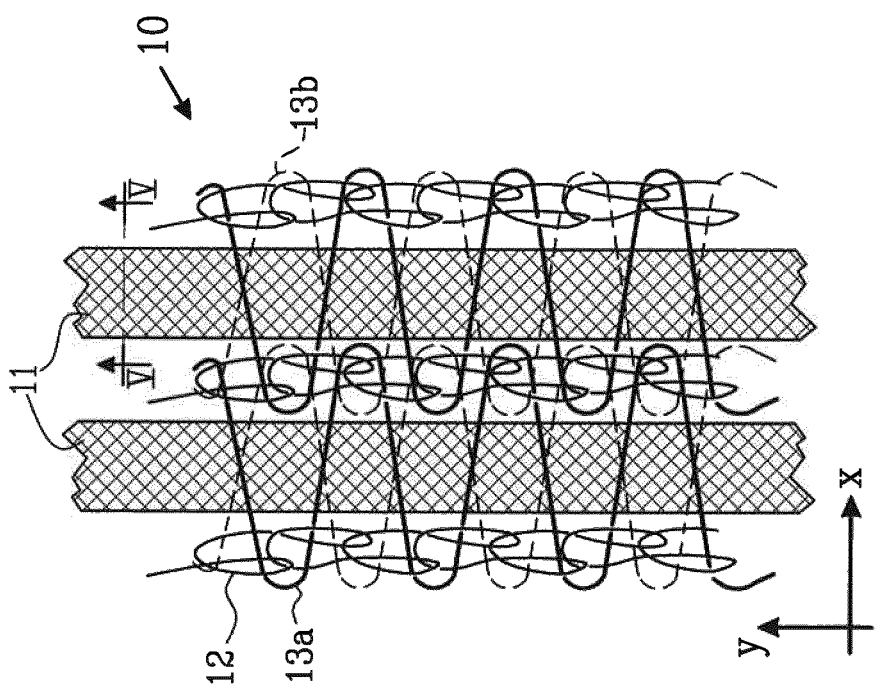

ENERGY SAVING GREENHOUSE SCREEN

CROSS-REFERENCE TO RELATED APPLICATIONS

This application is a U.S. National Phase Application of International Application No. PCT/EP2017/063035, filed May 30, 2017, which claims priority to Swedish Patent Application No. SE 1650748-5, filed May 30, 2016, each of which are hereby incorporated by reference in their entirety.

TECHNICAL FIELD

The present invention refers to a greenhouse screen of the kind comprising a plurality of flexible strips of film material, which are interconnected by a yarn framework by means of knitting, warp-knitting or weaving process to form a continuous product. More specifically the invention further refers to an energy saving greenhouse screen suitable for cultivation of crops with high demands on light transmittance. The screen has specific transparency properties and high UV stability. The invention further relates to a method for producing the greenhouse film material.

BACKGROUND OF THE INVENTION

The aim of protected cultivation in greenhouses is to modify the natural environment to increase yield, to improve product quality, to conserve resources, and to extend production areas and crop cycles among others. Depending on the location of the greenhouse and the crop grown therein, the crop needs to be protected during the full or parts of the year to avoid harmful stress that will lower the production.

One known type of greenhouse screens comprises a plurality of flexible strips of film material extending in parallel and which by means of a knitting, warp-knitting or weaving process and a yarn system are interconnected to form a continuous product, where the strips form a major part of the surface area of the product. Such a greenhouse screen is known for example through EP 0 109 951. Other examples of screens of this type are shown in FR 2 071 064, EP 1 342 824 and in WO 2008/091192. The strips of flexible material can be of selected materials providing desired properties with respect to light and/or heat transmission and reflection.

Greenhouse screens are frequently used for energy saving, shading and temperature control. Such screens must meet a number of requirements. On the one hand the light has to pass through the screens to be able to reach the plants. During night time, and especially in the early morning hours, a greenhouse energy saving screen should also retain the heat rising from the ground inside the greenhouse due to convection, both by reflection as well as by re-radiation in the greenhouse. Without a greenhouse energy saving screen the energy consumption increases in the greenhouse and the setting of an ideal climate is difficult.

However, a disadvantage of screens is that they form an additional layer in the beam path of the sun, which reduces the amount of light available, both by absorption and by reflection. At noon, the energy saving screen can be raised, or in case of excessive light, the energy saving screens may also be used for cooling.

During the morning hours, the energy saving screen is of special importance because of the need to reach an optimal plant growth temperature while simultaneously providing the maximum amount of light to ensure a high photosynthetic activity, without using excessive amounts of energy for heating. However, in the morning hours, when the sun is still at a low angle near the horizon, the reflectance of light onto the screen surface is higher than later on during the day when the sun rises higher above the horizon.

A greenhouse screen must also have good UV stability, guaranteeing at least 5 years of use in a greenhouse environment without significant yellowing, embrittlement, cracking of the surface or serious diminishing of the transparency or mechanical properties.

SUMMARY OF THE INVENTION

Viewed from a first prospective the present teachings can provide a greenhouse screen with properties which saves energy, either by keeping the heat inside the greenhouse, or outside in case of cooling, while it at the same time still has good UV stability properties and provides maximum transmittance of light to ensure a high photosynthetic activity. Thus, the present teachings provides a greenhouse screen comprising strips of film material that are interconnected by a yarn system of transverse and longitudinal threads by means of a knitting, warp-knitting or weaving process to form a continuous product. At least some of the strips comprise a film material in the form of a single- or multi-layer polyester film provided with a first anti-reflective coating on a first side of the film and a second anti-reflective coating or anti-reflective layer also on a second side of the film, said film material has a transparency of at least 93.5%. Said anti-reflective coating(s) has a refractive index at a wavelength of 589 nm that lies below 1.64, and said anti-reflective layer has a refractive index at a wavelength of 589 nm that lies below 1.64 when measured in the machine direction (MD).

BRIEF DESCRIPTION OF THE DRAWINGS

Example arrangements of greenhouse screens are described hereinafter with reference to the accompanying drawings.

FIG. 1 shows on an enlarged scale a part of warp-knitted screen according to one embodiment.

FIG. 2 shows a part of a warp-knitted screen according to another embodiment.

DETAILED DESCRIPTION

Figure 4:
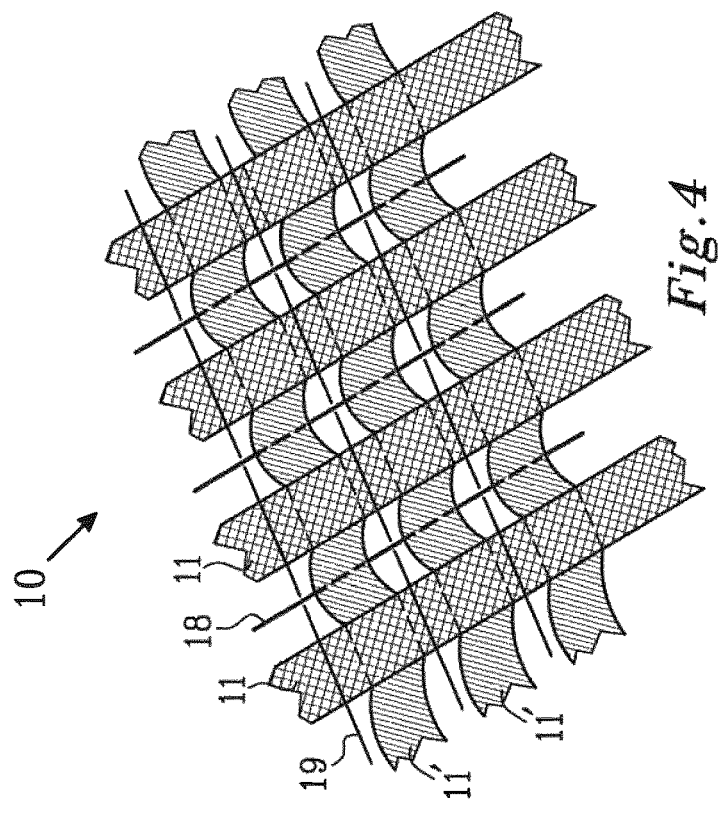
FIG. 4 shows a part of a woven screen according to a further embodiment.

FIGS. 1-4 disclose greenhouse screens 10 which according to the invention comprise a plurality of narrow film strips 11 held together by a yarn framework 12, 13a, 13b; 14, 15; 18, 19. The strips are preferably arranged closely edge to edge, so that they form a substantially continuous surface. In all embodiments the distance between the strips has been exaggerated for the sake of clarity to make the yarn system visible. The screen has a longitudinal direction y, and a transverse direction x, wherein the strips 11 extend in the longitudinal direction. In some embodiments strips 11' may extend also in the transverse direction. A typical width of the strips is between 2 mm and 10 mm.

In FIG. 1 film strips are interconnected by a warp knitting procedure as described in EP 0 109 951. The yarn framework comprises warp threads 12 forming loops or stitches and primarily extending in the longitudinal direction, y. The warp threads 12 are connected to one another by weft threads 13a and 13b extending across the film strips.

FIG. 1 shows an example of a mesh pattern for a fabric manufactured through a warp knitting process in which four guide bars are used, one for the strips 11, two for the connecting threads 13a and 13b extending transversely to the film strips and one for the longitudinal warp threads 12.

The space between the film strips 11 have been strongly exaggerated in order to make the mesh pattern clear. Usually the film strips 11 are located closely edge to edge. The longitudinal warp threads 12 are arranged on one side of the screen, the underside, while the transverse connection threads 13a and 13b are located on both sides of the fabric, the upper and the underside. The term "transverse" in this respect is not restricted to a direction perpendicular to the longitudinal direction, but means that the connection threads 13a and 13b extends across the film strips 11 as illustrated in the drawings. The connection between the longitudinal weft threads and the transverse threads are made on the underside of the fabric. The film strips can in this way be arranged closely edge to edge without being restricted by the longitudinal weft threads.

The longitudinal weft threads 12 in FIG. 1 extend continuously in an unbroken fashion along opposite edges of adjacent film strips, in a series of knitted stitches, in a so called open pillar stitch formation.

The transverse threads 13a and 13b pass above and below the film strips at the same location, i.e. opposed to each other to fixedly trap the film strips. Each knitted stitch in the longitudinal warp threads 12 has two such transverse threads 13a and 13b engaging with it.

FIG. 2 shows another example of a mesh pattern for a fabric similar to the one shown in FIG. 1. The difference is that the transverse threads 13a and 13b pass over one and two film strips 11 in an alternating way.

Figure 3:
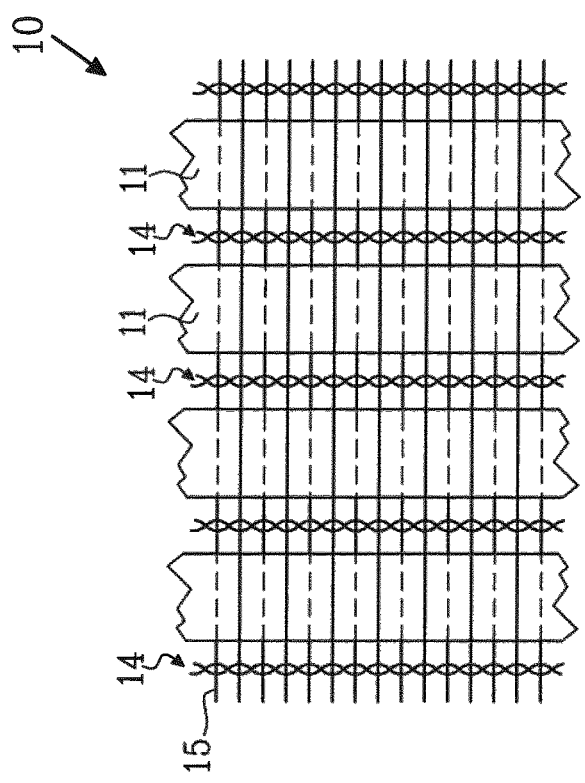
FIG. 3 shows on an enlarged scale a part of a woven screen.

FIG. 3 shows a woven screen in which the film strips 11 are interconnected by warp threads 14 extending in longitudinal direction y, and interwoven with weft threads 15 extending across the film strips primarily in the transverse direction x.

FIG. 4 shows another embodiment of a woven screen as described in U.S. Pat. No. 5,288,545 comprising film strips 11 (warp strips) extending in longitudinal direction y, and film strips 11' (weft strips) extending in transverse direction x. The weft strips 11' in the transverse direction may as shown in FIG. 4 always be on the same side of the warp strips 11 in longitudinal direction or may alternate on the upper and underside of the warp longitudinal strips 11. The warp and weft strips 11 and 11' are held together by a yarn framework comprising longitudinal and transverse threads 18 and 19. The screen may comprise open areas that are free from strips to reduce heat build-up below the screen.

Film Properties

The film material as disclosed herein has a transparency of at least 93.5%, such as at least 94.5%, or the transparency is at least 95.3%. The higher the transparency is, the better the growth of plants in the greenhouse.

The high transparency of the greenhouse screen is achieved by using raw materials and particle contents as described below. Mainly the increased transparency is achieved by providing antireflection coatings on one or both sides of the single or multilayer film material used in the greenhouse screen. Alternatively the single or multilayered film material may be provided with one antireflection coating on a first side and an anti-reflective layer on the second side. Specific properties concerning such anti-reflective coatings or layers will be described in more detail below.

In the disclosed greenhouse screen at least some of the strips are made of a single or multilayer polyester film material as described herein. A single-layer film material consists of only a single layer film which is also called base layer. In a multilayer embodiment, the film comprises the base layer (B-layer) and at least one further layer. The further layer which depending on its position in the film, is referred to the intermediate layer when at least one further layer is located on each of the two surfaces, or as the outer layer, when it forms a top layer of the film.

A film material as disclosed herein comprises at least a base layer (B-layer). In one embodiment the B-layer may comprise a first layer A (co-ex A layer) which is coextruded on a first side of the base layer. In yet a further embodiment the B-layer may comprise a further coextruded layer C (co-ex C layer) on the second side. The film material comprising at least the B-layer, and in some embodiments a co-ex A layer and a co-ex C layer, may further be coated with one or two antireflective coatings as described further below. If the co-ex A and/or C layers form an outer layer in the film they are advantageously provided with anti-reflective properties, also described further below The total thickness of the film material including the base layer, any co-extruded layers, anti-reflective coatings and/or anti-reflective co-extruded layers is 25 micrometers or less. The minimum thickness of the single or multilayer polyester film strips should be at least micrometers, such as at least 14 and not more than 23 micrometers or between 14.5 micrometers and 20 micrometers. If the film thickness is below 10 micrometers, the risk of film damages with crack formation during the final application in the greenhouse increases and the mechanical strength of the film will no longer be sufficient to accommodate the pulling forces in the screens which may arise during use. Above 40 micrometers, the film becomes too stiff and in the opened pulled-out state the bundle size becomes too large and gives excessive shading.

In the multilayer embodiment, the thickness of the base layer is at least as large as the sum of the thicknesses of the remaining layers (co-ex A and/or C layers). Advantageously the thickness of the base layer is at least 55% of the total film thickness and ideally at least 63% of the total film thickness.

In a multilayered film the thickness of the outer layers (i.e. the co-extruded A- and C-layers),) is at least 0.5 micrometers, such as at least 0.6 micrometers or at least 0.7 micrometers. The thickness of the outer layers is not more than 3 micrometers, such as not more than 2.5 micrometers, such as not more than 1.5 micrometers. Below 0.5 micrometers, process stability and the thickness uniformity of the outer layer decreases. From 0.7 micrometers very good process stability is obtained.

If the outer layers become too thick the cost-effectiveness decreases, as regenerates originating from the production process have to be added to the base layer, and if the base layer thickness becomes too thin compared to the total thickness of the film, a large percentage of regenerate must be added to this layer.

Polymers of the Base Layer and Other Layers

The polymer of the base layer and other layers (co-extruded A- and C-layers) of the film (excluding any UV stabilizers, particles, flame retardants, polyolefins, and other additives which are described further below) is made from a thermoplastic polyester to at least 80 wt.-%. Suitable thermoplastic polyesters for this purpose are, inter alia, a polyester of ethylene glycol and terephthalic acid (polyethylene terephthalate, PET), of ethylene glycol and naphthalene-2,6-dicarboxylic acid (=polyethylene-2,6-naphthalate, PEN), as well as any mixtures of said carboxylic acids and diols.

Particular preference is given to polyesters consisting of at least 85 mol %, such as at least 90 mol % or of at least 92 mol % of ethylene glycol and terephthalic acid units or naphthalene-2,6-dicarboxylic acid. The remaining monomer units derive from other aliphatic, cycloaliphatic or aromatic diols or dicarboxylic acids.

Suitable other aliphatic diols are, for example, diethylene glycol, triethylene glycol, aliphatic glycols of the formula HO—$(CH_2)_n$—OH, where n is preferably less than 10, cyclohexanedimethanol, butanediol, propanediol, etc. Other suitable dicarboxylic acids are, for example, isophthalic acid (IPA), adipic acid etc.

It has proven favorable for the reliability and weathering resistance in greenhouse applications if the film contains less than 2 wt.-%, such as less than 1.5 wt.-% diethylene glycol or units derived therefrom. For the same reasons it has proven to be advantageous if the film contains less than 12 mol %, such as less than 8 mol %, or less than 5 mol % of isophthalic acid (IPA). However, in multilayer embodiments the film, at least one of the A or C co-extruded outer layers may contain more than 8 mol % IPA, and ideally more than mol % IPA, but less than 23 mol % IPA, such as less than 19 mol %, and ideally less than 15 mol % (this modification serves to increase the transparency of the film as discussed further below).

If a layer has an IPA content of more than 8 mol % it advantageously contains additionally at least 1.5 wt.-%, such as more than 2.1 wt.-% of an organic UV stabilizer (as described below) to compensate for the lower UV stability in layers with higher IPA content. It has further proved to be advantageous for the film if the wt.-% of 1,4-cyclohexanedimethanol (CHDM) is less than 3 wt.-%, ideally less than 1 wt.-%, since the UV-stability of CHDM is extremely low.

The total content (based on the total weight of the film) of isophthalic acid, diethylene glycol and CHDM should not be greater than 7 wt.-%, and should ideally be less than 6 wt.-%. If the content of said co-monomers, in particular of the CHDM, does not exceed said limits, the UV stability of the screen made from the film is significantly better than in embodiments in which the limits are exceeded.

For the production of the inventive film the standard viscosity (SV) value of the polyester is selected so that the film ideally has a SV value>700, a SV of >650, such as a SV>600. The SV value of the film should be <950, such as <850. If the SV value is below 600, the film becomes brittle, causing frequent breaks during production. In addition, inside the greenhouse, the viscosity will rapidly decrease further resulting in a loss of flexibility of the film giving rise to breaking and premature failure of the screen. In addition, the mechanical properties mentioned below can no longer be achieved with a SV value lower than 600.

If the film has a higher SV than 950, then the polymer is so tough due to the high particle load in the extruder that excessively high currents can occur during operation of the extruder-electric motors and lead to pressure fluctuations during extrusion. This leads to poor operational reliability. In addition, the wear on the extrusion dies and the cutting tools becomes disproportionately high. Therefore, the standard viscosity (SV) value of the polyester is advantageously selected to between 700 and 850.

UV Light Protection

The film material used in the greenhouse screen as described herein has a low transmission in the wavelength range of less than 370 nm to 300 nm (i.e. within the UV light range). At any wavelength within this specified range, the transmission should be less than 40%, such as less than 30%, or less than 15%. This protects the screen against embrittlement and yellowing, and also in this way the plants and installations in the greenhouse are protected against UV light. Between 390 nm and 400 nm the transparency should be greater than 20%, such as greater than 30% or more than 40%, since above this wavelength there is clearly photosynthetic activity and plant growth would be negatively impacted due to excessive light filtering above this wavelength.

The low UV permeability is achieved by the addition of one or more organic UV stabilizers. A low permeability to UV light protects the film and the flame retardant contained therein from rapid deterioration and severe yellowing. The organic UV stabilizer may be selected from the group consisting of triazines, benzotriazoles or benzoxazinones. When the triazines 2-(4,6-diphenyl-1,3,5-triazin-2-yl)-5-(hexyl) oxy-phenol (Tinuvin® 1577) or 2-(2'-hydroxyphenyl)-4,6-bis (4-phenylphenyl) marketed by BASF under the tradename Tinuvin® 1600 are used, a transparency below 370 nm can be achieved at lower UV stabilizer levels, while simultaneously a higher transparency at wavelengths above 390 nm is achieved.

The base layer, or in the case of a multilayer film, at least one outer layer (co-ex A or C), or both outer layers (co-ex A and C) contain at least one organic UV stabilizer. The UV stabilizing triazine derivatives described above have a good thermal stability and a low outgassing from the screen in the conventional polyethylene terephthalate processing temperatures of 275-310° C.

UV stabilizers are contained in the outer layers (co-ex A and/or C) or in the base layer in quantities of between 0.3 and 3 wt.-%, such as between 0.75 and 2.8 wt.-%, or 1.2 to 2.5 wt.-% of UV stabilizer based on the weight of the layer into which they are added. In the multilayer embodiment, in addition to the outer layers, also the base layer may comprise a UV stabilizer. The content of the UV stabilizer in wt.-% is lower in this base layer, than in the outer layer(s). These specified contents in the layers relate to triazine. If instead of a triazine derivative, a UV stabilizer from the group of benzotriazoles or benzoxazinones is used, the triazine component must be replaced by 1.5 times the amount of a benzotriazole or benzoxazinone component.

Particles for the Improvement of Winding Capability

The base layer and outer co-ex A and/or C layer (s) may also include other particles for improving the winding capability of the film. Such inorganic or organic particles are for example, calcium carbonate, apatite, silicon dioxides, aluminum oxide, crosslinked polystyrene, crosslinked polymethyl-methacrylat (PMMA), zeolites, and other silicates such as aluminum silicates, or also white pigments such as $TiO_2$ or $BaSO_4$.

These particles are preferably added to the outer co-ex A and/or C layers to improve the winding capability of the film. When such particles are added, the use of silica-based particles is preferred because they reduce transparency the least. However, these particles may result in a loss of transparency by backscattering. When the proportion of such particles is too large in the outer layers, it is significantly more difficult to achieve high transparency properties. Therefore the proportion of these other particles is in any layer no more than 3 wt.-%, such as less than 1 wt.-%, or below 0.2 wt.-% in each layer, in each case based on the total weight the relevant layer.

The white-coloring polymers such as e.g. $TiO_2$ or $BaSO_4$, may also improve the winding capability of the film material. However, such white-coloring pigments tend to be incompatible with the major component of polyester, such as polypropylene, cyclic olefin copolymers (COC's), polyethylene, polystyrene, etc., and are therefore added in an amount of less than 0.3 wt.-% (based on the weight of the film), and ideally not at all (i.e. 0 wt.-%). White-coloring polymers have a negative effect on the transparency and they also have a strong negative influence on the burning behavior of the film. Furthermore they tend to be influenced by UV light and cause excessive yellowing and would therefore require a substantial additional amount of UV stabilizer, which significantly worsens the economy of the screen.

In case of a two layer film, these particles are added only to the one of the layers (co-ex A or C), or in case of a multilayer embodiment, they are added to the two outer layers only (co-ex A and C). So these particles will reach the base layer only to a small extent over the regenerate usually added to the base layer. Thus, only a minimum reduction of the transparency is achieved by the particles required for the winding.

Flame Retardants

Screens in greenhouses can be a potential fire hazard, since a fire starting by for example an electrical failure can spread via the screen to the entire greenhouse causing huge economic damages. Hence, since a few years the state of the art is flame retardant screens. To achieve a suitable fire performance for greenhouse curtains, no flame retardants are needed if the levels of light scattering particles and other particles, as well as white pigments and incompatible polymers are within the ranges as disclosed herein. Such a film achieved a score in the fire test of 4 or smaller.

If levels in one of the groups mentioned are higher than the suggested levels, or if for a special greenhouse application an even further reduction in flammability is required, it has proven to be advantageous that the film also contains a flame retardant based on organophosphorus compounds. These flame retardants are esters of phosphoric acid or phosphorous acid. It has proven to be advantageous if the phosphorus-containing compound is part of the polyester. Polymerized phosphorus-containing flame retardants such as Adeka rod 700 (4,4'-(Isopropylidene-diphenyl) to (diphenyl phosphate)) have, in addition to the disadvantage of outgassing of the flame retardant during production, also a very strong adverse effect on the hydrolytic stability of the film, i.e. the polyester, so that in the humid greenhouse climate it will produce rapid embrittlement of the film, and the screens therefore need to be replaced more often. These effects are significantly reduced by the use of built-in polyester chain phosphorus compounds.

The phosphorus compound can be part of the main chain, such as with the use of 2-carboxyethyl-methylphosphinic acid (other suitable compounds are described for example, in DE-A-23 46 787). However, phosphorus compounds in which the phosphorus is in a side chain reduces the tendency to hydrolyze under greenhouse conditions. Such compounds are compounds of the formula (I):

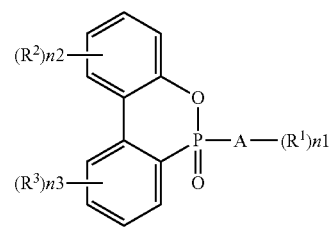

wherein:

$R^1$ is an ester-forming group selected from —$COOR^4$, —$OR^5$ and —$OCOR^6$;

$R^2$ and $R^3$ are independently selected from halogen atoms, hydrocarbon groups having 1-carbon atoms and $R^1$;

$R^4$ is a hydrogen atom, a carbonyl group or a hydrocarbon group having 1-10 carbon atoms which may contain a hydroxyl group or a carboxyl group;

$R^5$ is a hydrogen atom or a hydrocarbon group having 1-10 carbon atoms which may contain a hydroxyl group or a carboxyl group;

$R^6$ is a hydrocarbon group having 1-10 carbon atoms which may contain a hydroxyl group or a carboxyl group;

A is a divalent or trivalent hydrocarbon group having 1-8 carbon atoms;

n1 is 1 or 2;

and n2 and n3 are each 0, 1, 2, 3 or 4, particularly wherein said compound of formula (I) contains two ester-forming functional groups.

The monomer 6-oxo-dibenzo [c, e]-[1,2] oxaphosphorin-6-ylmethyl-succinic acid-bis (2-hydroxyethyl) ester (CAS 63562-34-5 No.) show a relatively low susceptibility to hydrolysis in the production of polyester, which also can give good operational reliability in the film production process.

The amount of flame retardants is adjusted so that the proportion of phosphorus in the film is at least 500 ppm, such as at least 1200 ppm, or at least 1600 ppm. The proportion of phosphorus should lie below 5000 ppm, such as below 4000 ppm or below 3000 ppm (based on the respective weights of all components used i.e. the amount of substance in moles). If the phosphorus content is below 500 ppm, the film will burn too quickly. The higher the proportion of phosphorus is, the lower the speed of burning will be, but this also lowers the hydrolysis stability. Above 5000 ppm, the film can be used for maximally a calendar year. Below 3000 ppm the hydrolysis speed is low enough, so that decomposition by hydrolysis is not to be expected within several years of use.

The phosphorus content may be distributed equally or differently between the layers. However, in one embodiment the outer co-extruded A- and/or C-layers contain at least 75% of the phosphorus concentration of the inner layer (s), or they may contain the same concentration of phosphorus or the outer layers contain at least 5% more phosphorus than the base layer. This leads to a particularly favorable burning behavior and an overall lower amount of phosphorus is needed.

Anti-Reflective Coatings

The film material as described herein has a transparency of at least 93.5%, such as at least 94.5%, or at least 95.3%. The higher the transparency, the better the growth of plants in the greenhouse will be. If 1% more light reaches the plants, production is increased by 1%. With the improved greenhouse screen as described herein the screen may remain closed until the light has reached 200 W/m² and thereby save energy without affecting production due to loss of light.

The transparency of the film material is achieved by using raw materials and particle contents as described herein. Mainly the increased transparency is achieved by providing anti-reflective coatings on at least one or on both sides of the film.

An antireflective coating is a type of optical coating applied to the surface of the single or multi-layered film to reduce reflection. The antireflective coatings or layer consist of transparent thin film structures with a contrasting refractive index compared to the base layer or the intermediate layer(s). Layer or coating thicknesses are chosen to produce destructive interference in the beams reflected from the interfaces, and constructive interference in the corresponding transmitted beams.

The film material, including the base layer, and, in the multilayer embodiments, also any outer/intermediate layers (co-ex A and/or C), is coated with an anti-reflective material having a lower refractive index than the polyester film itself. The anti-reflective coating material has a refractive index at a wavelength of 589 nm that lies below 1.64, such as below 1.60, or less than 1.58 when measured in the machine direction.

The two sides of the single or multilayer film material may be coated with different anti-reflective coatings or the film material may be coated with identical anti-reflective coatings on both sides.

Anti-reflective coating materials that may be used are from the group consisting of polyacrylates, silicones, polyurethanes, polyvinyl acetate and polyvinyl alcohols (PVOH), or a combination thereof. Suitable acrylates are described for example in EP-A-0144948 and suitable silicones are described for example in EP-A-0769540. Anti-reflective coating materials based on acrylates, tend not to bleed out or exfoliate during their installment in the greenhouse, while when using coatings based on silicone this may occur (or washing with polyvinyl alcohol). The first and/or second anti-reflective coatings are in one embodiment based on polyacrylates.

Said first and second anti-reflective polyacrylate coating(s) may contain more than 70 wt. %, such as more than 80 wt. %, or more than 93 wt. % of methyl methacrylate and ethyl acrylate repeating units. In one embodiment, more than 50 wt. % of the acrylate coating contains methyl methacrylate repeating units. In a further embodiment, the acrylate coating contains less than 10 wt. %, such as less than 5 wt. %, or less than 1 wt. % repeating units containing an aromatic structure element. Above 10 wt. % content of repeating units having an aromatic structural element there is a significant deterioration in weathering resistance of the anti-reflective coating. In one embodiment said second anti-reflective coating is a silicone-acrylate copolymer coating.

The thickness of the anti-reflective coating(s) is at least 60 nm, such as at least 70 nm or at least 78 nm. The thickness of the anti-reflective coating(s) is at most 130 nm, such as not more than 115 nm, and ideally not more than 110 nm. This achieves an ideal transparency increase in the desired wavelength range. In a one embodiment, the thickness of the anti-reflective coating is more than 87 nm, and such as more than 95 nm. In this embodiment, the thickness of the anti-reflective coating is less than 115 nm and ideally less than 110 nm. In this narrow thickness range of between 95 to 110 nm, both the transparency increase is in an optimum range and at the same time the reflection of the UV and blue range of the light with respect to the remainder of the visible spectrum is increased. This saves on one hand UV stabilizer, but mainly leads to the fact that the blue/red wavelength ratio shifts in favor of the red component. This leads to improved plant growth, an increased flowering and fruit setting is achieved and prohibits etiolation of the plants.

The anti-reflective coating(s) is applied to the film material from an aqueous dispersion inline prior to transverse stretching of the film by known methods (reverse gravure roll or meyer bar). In one embodiment, the anti-reflective coating contains at least 1 wt. % (based on the dry weight) of an UV stabilizer, such as Tinuvin® 479 or Tinuvin® 5333 DW. HALS (hindered amine light stabilizers) may lead to the regeneration (recycling of film residues from the production) and to a significant yellowing of the material which in turn reduces transparency and are therefore less preferred.

At least a first side of the film material is provided with an anti-reflective coating as described above. However, also the opposite side i.e. the second surface of the film material described above may be provided with an antireflection coating (see examples 2, 3, VB2 and 4 in table 1 below). In one embodiment an anti-reflective coating identical to the first anti-reflective coating is applied also to the second film surface, i.e. both the first and the second film surfaces are coated with the same anti-reflective acrylate as described above (see Examples 2, 3, and VB2 in Table 1 below).

In an alternative embodiment, the second anti-reflective coating has been modified compared to the first anti-reflective coating i.e. one side has an acrylate based coating and a silicone-acrylate copolymer coating is applied on the other side (see VB4 in Table 1 below). Silicone-acrylate copolymers are for example available from Dow Corning USA. With a double-sided anti-reflective coating as described above transparency values of >95.3% can be achieved.

Co-Extruded Outer Layers Comprising With Anti-Reflective Properties

In yet a further embodiment, the second side on the side opposite to the first anti-reflection coated side of the film may instead of the second anti-reflective coating be provided with a co-extruded (coex) outer layer comprising a co-monomer having anti-reflective properties on top of the base layer B (see Examples 1 and VB1 in Table 1 below). In this embodiment the co-extruded layer consists of polyester having a lower refractive index than oriented homo-polyethylene terephthalate. The refractive index at a wavelength of 589 nm, when measured in the machine direction, is below 1.70, such as below 1.65, and ideally below 1.60. This refractive index is achieved by a polymer to which a co-monomer is added at a content of at least 2 mol %, such as at least 3 mol %, and ideally the polymer is containing at least 6 mol % of co-monomer. Below 2 mol %, the desired values for the refractive index cannot be achieved. The co-monomer is in one embodiment, below 20 mol %, such as below 18 mol %, and ideally below 16 mol %. Above 16 mol.%, the UV stability is due to the amorphous nature of the film significantly worse and above 20 mol % the increased proportion of UV stabilizer cannot compensate the decreased UV stability caused by the co-monomer.

As co-monomers all monomers other than ethylene glycol and terephthalic acid (or dimethyl terephthalate) are included. The proportion of co-monomer always refers to the sum of all co-monomers. No more than two co-monomers are preferably used simultaneously. One co-monomer that may be used is isophthalic acid (IPA). In one embodiment, the co-extruded layer contains more than 6 mol % IPA, such as more than 9 mol % IPA, but less than 23 mol % IPA, such as less than 19 mol %, or less than 15 mol %. A coextruded layer with a co-monomer content greater than 6% contains in one embodiment at least 1.5 wt % such as more than 2.1 wt % organic UV stabilizer (as described above) to compensate the stability of layers with an increased co-monomer content.

By combining a film material which on one side is provided with an anti-reflective coating (for example, acrylate) and on the opposite side a layer with a polymer comprising a co-monomer (i.e. forming a co-polymer layer), the transparency of the invented film is at least 93.5%, but does not reach the high transparency values of >95.3%. However, the advantage of adding a co-polymer layer compared to a coating is that the film material is provided with a higher abrasion resistance, which may be beneficial in high-stress areas of the greenhouse (often cleaned areas).

Production Process of the Film

Polyester polymers of the individual layers are prepared by poly condensation, either starting from dicarboxylic acids and diol or from the esters of dicarboxylic acids, such as the dimethyl, and diol. Suitable polyesters have standard viscosity (SV) values in the range from 500 to 1300 in which the individual values are less important, but the average SV value of the materials used must be greater than 700 such as greater than 750.

The pigments, and/or particles, as well as the UV stabilizers may be added during the actual preparation of the polyester. For this purpose, the particles are dispersed in the diol, optionally ground, decanted and/or filtered and is added to the reactor either during the (trans) esterification step or in the poly condensation step. A concentrated particle-containing or additive-containing polyester masterbatch can be produced with a twin-screw extruder and can be diluted in the film extrusion with particle-free polyester. It has proven to be favorable when masterbatches which contain less than 30 wt.-% polyester are used. In particular, the amount of $SiO_2$ particles contained in the masterbatch should not exceed 20 wt.-% pure $SiO_2$ (the danger of gel formation). Another option is to add particles and additives directly during film extrusion in a twin-screw extruder.

If screw extruders are used, dry the polyesters beforehand. When using a twin-screw extruder with degassing zone the drying step can be dispensed with.

First, the polyester or the polyester mixture of the individual layers in the single layer or multi-layer films are compressed and liquefied in extruders. The melt(s) in a single or multilayer is/are thereafter formed to flat melt films, pressed through a slot die and drawn off on a chill roll and one or more take-off rolls, whereupon it cools and solidifies.

The inventive film is biaxially oriented, i.e. biaxially stretched. The biaxial orientation of the film is most frequently carried out sequentially. Here the film is stretched first longitudinally (i.e. in the machine direction=MD) and then transversely (i.e. perpendicularly to machine direction=TD). The longitudinally oriented stretching can be carried out by means of two rollers running at different speeds corresponding to the desired stretching ratio. For the transverse stretching an appropriate tenter frame is generally used.

The temperature at which the stretching is carried out can vary within a relatively wide range and depends on the desired properties of the film. In general the stretching in the longitudinal direction is performed in a temperature range of 80 to 130° C. (heating temperatures 80 to 130° C.) and in the transverse direction in a temperature range of 90° C. (start of stretching) to 140° C. (end of the stretching). The longitudinal stretching ratio is in the range of 2.5:1 to 5:1, preferably from 2.8:1 to 4:1. A stretch ratio above 5 leads to a significant deterioration in manufacturability (tears).

The transverse stretching ratio is generally in the range of 2.5:1 to 5:1, preferably from 3.2:1 to 4:1. A higher transverse stretching ratio than 4.8 leads to a significant deterioration in manufacturability (tears), and should be avoided. Generally, a higher area stretching ratio (longitudinal direction×transverse direction), gives a higher refractive index for the film which in turn results in a lower film transparency. Therefore, the area stretching ratio (=stretching ratio MD×stretching ratio TD) is in one embodiment below such as below 18.

To achieve the desired film properties, it has proven advantageous when the stretch temperature (in MD and TD) is at 125° C. and preferably below 118° C. Before the transverse stretching, one or both surface(s) of the film may be coated in-line according to methods known per se. The in-line coating can be used for applying a coating to increase transparency (anti-reflection). The in-line anti-reflective coating of the film reduces the overall production cost of the film as opposed to when the antireflective coating is applied in a separate off-line step. In the subsequent heat-setting, the film is held under tension over a period of about 0.1 to 10 s at a temperature of 150 to 250° C., and to achieve the shrinkage and extension values it is relaxed at least 1%, such as at least 3% or at least 4% in the transverse direction.

This relaxation will take place in a temperature range of 150 to 190° C. In order to reduce the transparency bow, the temperature in the first fixing zone is below 220° C., such as below 190° C. In addition, for the same reason, at least 1%, such as at least 2% of the total transverse stretching ratio should lie in the first fixing region, in which it is usually not stretched. The film is then wound up in a customary manner.

Other Film Properties

The film according to the method described above has a shrinkage at 150° C. in longitudinal and transverse direction of less than 5%, such as below 2% or less than 1.5%. This film has a further shrinkage to an extent of less than 3%, such as less than 1% or less than 0.3% at 100° C. This dimensional stability can be obtained prior to winding, for example, by appropriate relaxation of the film (see process description). This dimensional stability is important in order to avoid a subsequent shrinkage of the film strip when used in screens, which would lead to an increased passage of air between the strips (i.e. a reduction of the energy saving effect). Relaxation is performed both during the manufacture of roller screens as well as greenhouse screens as shrinkages or extensions which are too large will result in wave-like alterations in the finished products.

The film of the invention further comprises a modulus of elasticity in both directions of the film which is greater than 3000 N/mm$^2$, such as greater than 3500 N/mm$^2$ or (in at least one film direction)>4500 N/mm$^2$ in the longitudinal and transverse directions. The F5-value (force at 5% extension) is in the longitudinal and transverse direction at about 80 N/mm$^2$ such as about 90 N/mm$^2$. These mechanical properties can be set and obtained by varying the parameters of the biaxial stretching of the film in the context of the abovementioned process conditions.

Films with said mechanical properties are not extended excessively during usage when pulled and remain easily manageable.

To achieve the transparency values of the invention it has also proved to be favorable if the haze of the film is less than 18%, such as less than 8%, or less than 3%. The lower the turbidity, the less is the back scattering of light and thus the loss of transparency. In compliance with the particle contents and polymer composition of the invention, these haze values are reached.

Applications

The film is advantageously cut into narrow strips with a width of 2-10 mm, from which then together with polyester yarn (also this must be UV stabilized) a fabric or screen is produced, which is hung in the greenhouse. The strips of film can be combined with strips of other films, particularly with films having a light scattering effect.

In order to provide the desired transparency properties at least 10%, such as at least 20%, at least 30%, at least 40%, at least 50%, at least 60%, at least 70%, at least 80%, at least 90% of the surface area of the screen should be strips (11) of the single or multilayer film as described herein. According to one embodiment all strips (11) in the screen are of the single or multilayer polyester film described and the strips (11) are arranged closely edge to edge, so that they form a substantially continuous surface. In a further embodiment the film itself is installed in the greenhouse, or alternatively the knitted, warp-knitted or woven film strips may be glued to the yarn network to form a reinforced screen material.

In some embodiments the strips of inventive film material may be interconnected by a yarn framework having liquid-transporting capacity by capillary action. The yarn framework may be thermally bonded to at least one side of the strips of knitted, warp-knitted or woven film material, and wherein also those parts of the yarn framework that is thermally bonded to the strips have liquid-transporting capacity by capillary action. These installations described above result in a reduction of energy losses during the night and ensures particularly in the early morning, a good light supply to the plants.

EXAMPLES

The following conditions apply for Examples 1-3 and VB1-5:

The polymer mixtures are melted at 292° C. and electrostatically applied through a slot die onto a cooling roll at a temperature controlled to 50° C. The resulting film is thereafter longitudinally and then transversely stretched under the following conditions:

Longitudinal stretching:
Heating 75-115° C.
Stretching temperature 115° C.
Longitudinal stretching ratio 3.8
Transverse stretching:
Heating 100° C.
Stretching temperature 112° C.
Transverse stretching ratio (including stretching in first fixation zone) 3.9
Setting:
temperature 237-150° C.
Duration 3 s
Relaxation in TD at 200-150° C. 5%

In the examples the following raw materials are used:

PET1=polyethylene terephthalate made from ethylene glycol and terephthalic acid with an SV value of 820 and DEG content of 0.9 wt.-% (diethylene glycol as a monomer).

PET2=polyethylene terephthalate with an SV value of 730, the (6-oxo-dibenzo [c, e]-[1,2]-oxaphosphorin-6-ylmethyl) succinic acid bis (2-hydroxyethyl) ester as co-monomer, wherein the proportion of phosphorus therefrom is 18000 ppm in the raw material.

PET3=polyethylene terephthalate with an SV value of 700, containing 20 wt.-% Tinuvin® 1577. The UV stabilizer has the following composition 2-(4,6-diphenyl-1,3,5-triazin-2-yl)-5-(hexyl) oxy-phenol (Tinuvin® 1577 from BASF, Ludwigshafen, Germany). Tinuvin® 1577 has a melting point of 149° C. and is thermally stable at 330° C.

PET 4=polyethylene terephthalate with an SV of 700 and 15 wt.-% silica Sylysia 310 P with a d50 of 2.7 microns (Manufacturers FUJI SILYSIA CHEMICAL LTD. Greenville N.C./USA). The $SiO_2$ was incorporated into the polyethylene terephthalate using a twin-screw extruder.

PET 5=polyethylene terephthalate with an SV value of 710, the 25 mol % of isophthalic acid as a co-monomer.

The following Table 1 summarizes the formulations, manufacturing conditions and the resulting film properties (wt.-% is calculated based on the total weight of each layer):

TABLE 1

| | | Example 1 | Example 2 | Example 3 | VB1 | VB2 | VB3 | VB4 | VB5 |
|---|---|---|---|---|---|---|---|---|---|
| Layer | Film thickness (μm) | 15 | 15 | 15 | 15 | 15 | 15 | 15 | 15 |
| | Co-Ex A layer | 0.8 | 0.8 | 0.8 | 0.8 | 0.8 | 0.8 | 0.8 | 0.8 |
| | Base layer B | 13.4 | 13.4 | 13.4 | 13.4 | 13.4 | 13.4 | 13.4 | 13.4 |
| | Co-Ex C layer | 0.8 | 0.8 | 0.8 | 0.8 | 0.8 | 0.8 | 0.8 | 0.8 |
| | Coating on side A | Dry thickness 96 nm. Acrylate and application meth. as in Ex. 1 of EP0144948 | Dry thickness 96 nm. Acrylate and application meth. as in Ex. 1 of EP0144948 | Dry thickness 96 nm. Acrylate and application meth. as in Ex. 1 of EP0144948 | Dry thickness 30 nm. Acrylate and application meth. as in Ex. 1 of EP0144948 | Dry thickness 30 nm. Acrylate and application meth. as in Ex. 1 of EP0144948 | | Dry thickness 160 nm. Acrylate and application meth. as in Ex. 1 of EP0144948 | |
| | Coating on side C | | Dry thickness 96 nm. Acrylate and application meth. as in Ex. 1 of EP0144948 | Dry thickness 96 nm. Acrylate and application meth. as in Ex. 1 of EP0144948 | | Dry thickness 30 nm. Acrylate and application meth. as in Ex. 1 of EP0144948 | | Dry thickness 150 nm. Acrylate and application meth. as in Ex. 1 of EP0144948 | |

TABLE 1-continued

|  |  | Example 1 | Example 2 | Example 3 | VB1 | VB2 | VB3 | VB4 | VB5 |
|---|---|---|---|---|---|---|---|---|---|
| Co-x A-layer | PET 1 (wt.-%) | 89 | 89 | 77 | 89 | 89 | 89 | 89 | 34 |
|  | PET 2 (wt.-%) |  |  | 12 |  |  |  |  |  |
|  | PET 3 (wt.-%) | 10 | 10 | 10 | 10 | 10 | 10 | 10 | 15 |
|  | PET 4 (wt.-%) | 1 | 1 | 1 | 1 | 1 | 1 | 1 | 1 |
|  | PET 5 (wt.-%) |  |  |  |  |  |  |  | 50 |
| B-layer | PET 1 (wt.-%) | 95 | 95 | 83 | 95 | 95 | 95 | 95 | 95 |
|  | PET 2 (wt.-%) |  |  | 12 |  |  |  |  |  |
|  | PET 3 (wt.-%) | 5 | 5 | 5 | 5 | 5 | 5 | 5 | 5 |
| Co-Ex C-layer | PET 1 (wt.-%) | 34 | 89 | 77 | 34 | 89 | 89 | 89 | 34 |
|  | PET 2 (wt.-%) |  |  | 12 |  |  |  |  |  |
|  | PET 3 (wt.-%) | 15 | 10 | 10 | 15 | 10 | 10 | 10 | 15 |
|  | PET 4 (wt.-%) | 1 | 1 | 1 | 1 | 1 | 1 | 1 | 1 |
|  | PET 5 (wt.-%) | 50 |  |  | 50 |  |  |  | 50 |
| Transparency (web centre) | in % | 94.3 | 95.5 | 95.5 | 92.8 | 92.1 | 90.8 | 93.2 | 93.1 |
| Turbidity |  | 1.8 | 2 | 2 | 1.9 | 1.8 | 1.8 | 2 | 2 |
| UV-stability UTS | in % | 65 | 75 | 66 | 64 | 74 | 77 | 75 | 64 |
| Flame resistance | Grade | 4 | 4 | 2 | 4 | 4 | 4 | 5 | 4 |
| E-Module MD | N/mm2 | 4200 | 4360 | 3950 | 4100 | 4200 | 4200 | 4360 | 4390 |
| E-Module TD | N/mm2 | 4750 | 4800 | 4280 | 4600 | 4750 | 4750 | 4800 | 4680 |
| F5 MD | N/mm2 | 105 | 107 | 101 | 106 | 105 | 105 | 107 | 108 |
| F5 TD | N/mm2 | 114 | 116 | 103 | 113 | 114 | 114 | 116 | 112 |
| Shrinkage MD | in % | 1.4 | 1.3 | 1.4 | 1.6 | 1.4 | 1.4 | 1.3 | 1.3 |
| Shrinkage TD | in % | 0.2 | 0.3 | 0.4 | 0.3 | 0.2 | 0.2 | 0.3 | 0.1 |
| Expansion MD at 100° C. | in % | 0 | 0.1 | 0 | −0.1 | 0 | 0 | 0 | 0.1 |
| Expansion TD at 100° C. | in % | 0.1 | 0 | 0 | 0 | 0.1 | 0.1 | 0 | 0 |
| SV-film |  | 738 | 745 | 740 | 750 | 743 | 740 | 741 | 745 |
| Transparency minimum between 390 and 400 nm |  | 81 | 85 | 85 | 81 | 85 | 77 | 85 | 79 |
| Transparency maximum between 300 and 370 nm |  | 11 | 13 | 13 | 11 | 13 | 8 | 13 | 9 |
| Note |  |  |  |  |  |  |  |  |  |

DESCRIPTION OF TEST METHODS

The following analytical methods were used to determine parameters used:

Measurement of the Mean Particle Diameter d50

Determination of the average particle size d50 was carried out using a Malvern Mastersizer 2000. For this, the particles were dispersed in water and transferred to a cuvette that was analyzed in the meter wherein the size of the particles was determined by laser diffraction. In general, while the detector captures an image intensity of the diffracted laser light from the angle-dependent light intensity using a mathematical correlation function, the particle size distribution is calculated. The particle size distribution is characterized by two parameters, the median value d50 (=measure of location for the average value) and the degree of scatter SPAN98 (=measure of the scatter of the particle diameter). The test procedure was carried out automatically and included the mathematical determination of the d50 value.

Measurements on the film produced with these particles result in a 15-25% lower d50 value compared to the initial value of the particles before the start of production.

UV/Vis Spectra or Transmission at Wavelength X

Transmission of the films were measured in a UV/Vis double beam spectrophotometer (Lambda 12 or 35) Perkin Elmer USA. An approximately (3×5) cm wide film specimen is inserted into a flat sample holder perpendicular to the measurement beam in the beam path. The measurement beam was directed via a 50 mm integrating sphere toward the detector where the intensity is used to determine the transparency at the desired wavelength. The background was air. The transmittance is read at the desired wavelength.

Transparency

Transparency was measured in accordance with ASTM-D 1003-61 (Method A) by haze-Gard plus from BYK-Gardner GmbH Germany.

Clarity

Determination of the clarity is carried out according to ASTM-D-1003 and by using the haze-gard plus from BYK-Gardner GmbH. The light is deflected within a small solid angle, such that the amount of scattered light is concentrated in a narrow lobe. Clarity is measured in an angular range of less than 2.5°. To measure the clarity, the film is applied close to the light exit-opening. (Image sharpness)

SV (Standard Viscosity)

The standard viscosity SV, was measured based on DIN 53 726, at a concentration of 1% in dichloroacetic acid (DCA) in an Ubbelohde viscometer at 25° C., which measures the time required for the solution to pass through a capillary. The viscosity of the DCA solution comprising the dissolved film corresponds to the mean chain length of the polymer used. Insoluble material like inorganic particles (e.g. $TiO_2$ or $SiO_2$) does not influence the viscosity measurement, but has to be accounted for during sample weighing (see below). From the relative viscosity ($\eta rel$) the dimensionless SV value is determined as follows:

$$SV=(\eta rel-1)\times 1000$$

To be able to compare the chain lengths of polymers used in an unfilled film versus a filled film, the amount of insoluble material has to be taken into account in case the film contains such particles. Polymer raw materials or film containing insoluble particles were dissolved in DCA and the insoluble pigments centrifuged off before measuring. The proportion of insoluble particles was determined by ash determination. In case a filled film is to be analyzed, a larger amount of filled film has to be dissolved in dichloroacetic acid compared to unfilled film. The following formula is used to calculate the weight of the sample to be dissolved in DCA in case the film contains insoluble particles:

Total weight of sample (filled film) to be dissolved in DCA=(weight of the sample for an unfilled film)/((100−insoluble particle content of filled film in wt. %)/100). For example if 0.4 g of standard unfilled film is dissolved in 40 ml DCA, and the filled film to be analyzed contains 5% insoluble particles (as determined by ash determination), 0.42 g of filled film has to be dissolved in DCA to compensate for the weight of insoluble particles:

$$0.4 \text{ g}/((100-5)/100)=0.42 \text{ g}$$

Mechanical Characteristics

The mechanical properties were determined according to the tensile test DIN EN ISO 572-1 and -3 (specimen type 2) on 100 mm×15 mm film strips.

Shrinkage

Thermal shrinkage was determined on square film samples with an edge length of 10 cm. Samples were cut out so that one edge was parallel to the machine direction and one edge was perpendicular to the machine direction. The samples were measured precisely (edge length $L_0$ was determined for each machine direction TD and MD, i.e. $L_{0\ TD}$ and $L_{0\ MD}$) and annealed 15 min at the stated shrinkage temperature (here 150° C.) in a convection oven. The samples were removed and measured precisely at room temperature (edge length $L_{TD}$ and $L_{MD}$). Shrinkage is calculated from the equation:

$$\text{Shrinkage [\%] MD}=100\times(L_{0\ MD}-L_{MD})/L_{0\ MD}, \text{ or}$$

$$\text{Shrinkage [\%] TD}=100\times(L_{0\ TD}-L_{TD})/L_{0\ TD}$$

Expansion

The thermal expansion was determined on square film samples with an edge length of 10 cm. The samples were measured precisely (edge length $L_0$), annealed for 15 minutes at 100° C. in a convection oven, and then measured precisely at room temperature (edge length L). The expansion results from the equation:

$$\text{Expansion [\%]}=100\times(L-L_0)/L_0$$

and was determined separately in each direction on the film.

UV Stability

The UV stability and the UTS value was determined and specified in % of initial value as in DE69731750 on page 8 (DE of WO9806575), except that the exposure time was not 1000 h but 2000 h.

Flame Resistance

A 30×30 cm piece of film was fastened with two clips at the corners and hung vertically. Generally, it must be ensured that at the point of suspension, there is no air movement, which moves the piece of film. A slight air from above is acceptable. The film piece was then exposed to a flame from below in the center of the lower side. For flame treatment, a commercial cigarette lighter, or better a Bunsen burner is used. The flame must be longer than 1 cm and less than 3 cm. The flame was held long enough to the film until this continued to burn without an ignition flame (at least 3 seconds). The flame was thereby held maximally for 5 seconds at the most, after which the burning and shrinkage was examined. Four such ignition processes were performed.

In the examples given here, the flame resistance is evaluated with the following grades:

1=the film was ignited during 4 ignitions, and never burned more than 3 seconds.

2=the film ignited and extinguished after less than 15 seconds, and more than 30% of the film surface remained.

3=the film ignited and extinguished after less than 20 seconds, and more than 30% of the film surface remained.

4=the film ignited and extinguished after less than 40 seconds, and more than 30% of the film surface remained.

5=the film ignited and extinguished after less than 40 seconds and more than 10% of the film surface remained.

6=the film ignited and burned more than 40 seconds, or less than 10% of the film surface remained after extinction

Determination of the Refractive Index as a Function of Wavelength

To determine the refractive index of a film substrate and an applied coating or a co-extruded (coex) layer which has a refractive index other than that of the base material as a function of wavelength, spectroscopic ellipsometry is used. Background information and theory behind this method can for example be found in the following publication: J. A. Woollam et al, Overview of variable angle spectroscopic ellipsometry (VASE): I. Basic theory and typical applications, Proc. SPIE Vol. CR72, p. 3-28, Optical Metrology, Ghanim A. Al-Jumaily; Ed.

First one analyzes the base film without coating(s) or modified coextruded layer(s). To suppress the back reflection of the film the back (side which is not analyzed) is roughened by an abrasive paper with a fine grain size (for example, P1000). The sheet is then measured with a spectroscopic ellipsometer which is equipped with a rotating compensator, e.g. a M-2000 from J. A. Woollam Co., Inc. The machine direction of the sample film is parallel to the light beam. The measured wavelength is in the range of 370 to 1000 nm, the measurement angle is 65, 70 and 75°.

The ellipsometric data ψ and Δ are then modeled to match the experimental data. The Cauchy model is suitable in the present case $$n(\lambda) = A + \frac{B}{\lambda^2} + \frac{C}{\lambda^4} \text{(wavelength } \lambda \text{ in microns)}.$$

where n(λ) is the refractive index at wavelength λ. The parameters A, B and C are varied such that the data matches as closely as possible the measured spectrum ψ and Δ.

To test the quality of the model the MSE (Mean Squared Error) value may be included to compare the Model with measured data (ψ(λ) and Δ(λ)). MSE should be minimized.

$$MSE = \sqrt{\frac{\frac{1}{3n-m}\sum_{i=1}^{n}}{[(N_{E,i} - N_{G,i})^2 + (C_{E,i} - C_{G,i})^2 + (S_{E,i} - S_{G,i})^2]}} \cdot 1000$$

n=number of wavelengths,
m=number parameter fit
N=cos(2ψ),
C=sin(2ψ)cos(Δ),
S=sin(2ψ)sin(Δ)[1]

The resulting Cauchy parameters A, B and C for the base film allow the calculation of the refractive index n as a function of wavelength, valid in the measured range from 370 to 1000 nm.

The coating or a modified coex layer can be analyzed similarly. The parameters of the base film are now already analyzed and well known and should be kept constant during the modeling of the additional layer. Also for determining the refractive index of a coating or a coextruded layer the back of the film has to be roughened, as described above. Again, one can use the Cauchy model to describe the refractive index depending on the wavelength of the additional layer. The layer is now on the substrate, which has to be accounted for in the modeling. The thickness of the layer affects the spectrum obtained and must also be included in the modeling process.

The invention claimed is:

1. A greenhouse screen comprising strips of film material that are interconnected by a yarn system of transverse threads and longitudinal threads by means of knitting, warp-knitting or weaving process to form a continuous product, and at least some of said strips comprise an anti-reflective film material in the form of a single- or multilayer polyester film provided with a first anti-reflective coating on a first side of the single- or multilayer polyester film and a second anti-reflective coating or an anti-reflective layer on a second side of the single- or multilayer polyester film, said anti-reflective film material in the form of a single- or multilayer polyester film has a total thickness of at least 10 micrometers and at the most 40 micrometers, a transparency of at least 93.5%, wherein each of said anti-reflective coating(s) have a refractive index at a wavelength of 589 nm that lies below 1.64, and said anti-reflective layer has a refractive index at a wavelength of 589 nm that lies below 1.64 when measured in the machine direction (MD).

2. The greenhouse screen according to claim 1, wherein the second side of said anti-reflective film material is provided with said second anti-reflective coating.

3. The greenhouse screen according to claim 1, wherein said first and second anti-reflective coatings are of the group of materials consisting of polyacrylates, silicones, polyurethanes, polyvinyl acetate, and polyvinyl alcohols (PVOH), or a combination thereof.

4. The greenhouse screen according to claim 3, wherein said first and second anti-reflective coatings are based on polyacrylates containing more than 70 wt. % methyl methacrylate and ethyl acrylate repeating units, and less than 10 wt. % of said repeating units containing an aromatic structure element.

5. The greenhouse screen according to claim 4, wherein said first and second anti-reflective coatings contain more than 50 wt. % methyl methacrylate repeating units.

6. The greenhouse screen according to claim 1, wherein the anti-reflective layer is present on the second side of the single- or multilayer polyester film, wherein the anti-reflective layer is a co-extruded anti-reflective layer on a base layer of the single- or multilayer polyester film.

7. The greenhouse screen according to claim 6, wherein the co-extruded anti-reflective layer comprises polyester having a refractive index at a wavelength of 589 nm, of below 1.60 when measured in the machine direction (MD).

8. The greenhouse screen according to claim 7, wherein the polyester comprises a co-monomer in a content of at least 2 mol % but less than 20 mol %.

9. The greenhouse screen according to claim 8, wherein the polyester contains the co-monomer in a content of more than 6 mol % but less than 20 mol %, and wherein the co-extruded anti-reflective layer comprises at least 1.5 wt % of an organic UV-stabilizer.

10. The greenhouse screen according to claim 1, wherein the single layer polyester film contains at least 0.3 wt.-% of an organic UV-stabilizer based on the weight of the single layer polyester film or at least each of the outer layers in the multilayer film contain at least 0.3 wt.-% of an organic UV-stabilizer based on the weight of each outer layer.

11. The greenhouse screen according to claim 10, wherein the organic UV-stabilizer is selected from the group consisting of triazines, benzotriazole, and benzoxazinones.

12. The greenhouse screen according to claim 1, wherein the film material is the multilayer polyester film and contains at least one outer layer wherein the polyester in the at least one outer layer has an isophthalic acid (IPA) content of 8-23 mol % IPA.

13. The greenhouse screen according to claim 1, wherein at least 10% of the strips in the greenhouse screen comprise said single- or multilayer polyester film material.

14. The greenhouse screen according to claim 1, wherein the knitted, warp-knitted or woven strips are glued onto a yarn network to form a reinforced screen material.

15. The greenhouse screen according to claim 7, wherein the co-extruded anti-reflective layer comprises a co-monomer being isophthalic acid (IPA) and is added to the co-extruded anti-reflective layer at a concentration of more than 6 mol % IPA, but less than 23 mol %.

16. The greenhouse screen according to claim 1, wherein the anti-reflective film material is in the form of a single layer polyester film.

17. The greenhouse screen according to claim 1, wherein the anti-reflective film material is in the form of a multilayer polyester film.

* * * * *